(12) United States Patent
Lindel et al.

(10) Patent No.: US 10,473,262 B2
(45) Date of Patent: Nov. 12, 2019

(54) HOUSEHOLD REFRIGERATION APPLIANCE WITH NON-DESTRUCTIVELY RELEASABLE ROLLER ASSEMBLY IN THE BASE OF A HOUSING AND METHOD FOR PRODUCING THE HOUSEHOLD REFRIGERATION APPLIANCE

(71) Applicant: BSH HAUSGERAETE GMBH, Munich (DE)

(72) Inventors: Andreas Lindel, Heidenheim (DE); Ralf Spiller, Giengen (DE); Michael Krapp, Nattheim (DE)

(73) Assignee: BSH Hausgeraete GmbH, Munich (DE)

(*) Notice: Subject to any disclaimer, the term of this patent is extended or adjusted under 35 U.S.C. 154(b) by 0 days.

(21) Appl. No.: 15/834,631

(22) Filed: Dec. 7, 2017

(65) Prior Publication Data

US 2018/0156380 A1 Jun. 7, 2018

(30) Foreign Application Priority Data

Dec. 7, 2016 (DE) .......................... 10 2016 224 394

(51) Int. Cl.
*F16M 11/42* (2006.01)
*F25D 11/02* (2006.01)
(Continued)

(52) U.S. Cl.
CPC .......... *F16M 11/42* (2013.01); *A47L 15/4253* (2013.01); *F25D 11/02* (2013.01); *F25D 23/00* (2013.01); *F25D 23/021* (2013.01); *F25D 23/062* (2013.01); *F25D 25/025* (2013.01); *F25D 2400/32* (2013.01); *F25D 2400/38* (2013.01)

(58) Field of Classification Search
CPC ...... F25D 23/00; F25D 23/021; F25D 23/062; F25D 25/025; F25D 11/02; F25D 2400/32; F25D 2400/38; F25D 23/067; F25D 23/064; F25D 23/066; F25D 23/10; F16M 11/42
USPC ........ 312/400, 401, 351.11, 406, 406.2, 409, 312/116
See application file for complete search history.

(56) References Cited

U.S. PATENT DOCUMENTS 2,911,666 A * 11/1959 Schultz, Jr. ............. B60B 33/00
16/100
4,026,570 A * 5/1977 Feinberg ................ A45C 5/143
16/30
(Continued)

FOREIGN PATENT DOCUMENTS

DE 102009002500 A1 10/2010
DE 102012221735 * 5/2014
EP 2554931 * 6/2013

*Primary Examiner* — Janet M Wilkens
(74) *Attorney, Agent, or Firm* — Laurence A. Greenberg; Werner H. Stemer; Ralph E. Locher

(57) ABSTRACT

A household refrigeration appliance has a housing in which at least one receiving area for food is implemented. At least one roller is arranged on the housing and by which the household refrigeration appliance can be rolled on an underlying surface. The roller is arranged rotatably mounted on a plate-like, separate bearing bracket and a roller assembly containing the roller and the bearing bracket is arranged non-destructively releasably on a base of the housing.

16 Claims, 8 Drawing Sheets

(51) Int. Cl.
*F25D 23/02* (2006.01)
*F25D 23/06* (2006.01)
*F25D 25/02* (2006.01)
*F25D 23/00* (2006.01)
*A47L 15/42* (2006.01)

(56) References Cited

U.S. PATENT DOCUMENTS

| | | | | |
|---|---|---|---|---|
| 4,719,663 A * | 1/1988 | Termini | ............ | B60B 33/0002 16/30 |
| 4,843,835 A * | 7/1989 | Goetz | ............ | F25D 21/14 62/285 |
| 5,277,486 A * | 1/1994 | Bustos | ............ | A47F 3/0408 211/151 |
| 5,711,162 A * | 1/1998 | Wolanin | ............ | F16M 11/42 29/513 |
| 6,601,806 B2 * | 8/2003 | Wing | ............ | B60B 1/006 16/19 |
| 7,017,879 B2 * | 3/2006 | Wetterberg | ............ | A47B 47/02 16/29 |
| 8,240,681 B2 * | 8/2012 | Taguchi | ............ | B62B 5/0083 16/19 |
| 8,240,685 B2 * | 8/2012 | Fan | ............ | B60B 33/0002 280/79.11 |
| 8,857,774 B2 * | 10/2014 | Aoyama | ............ | B60B 33/0002 108/177 |
| 2005/0015928 A1 * | 1/2005 | Arsenault | ............ | B60B 33/0002 16/300 |
| 2005/0279895 A1 * | 12/2005 | Lee | ............ | A47B 91/04 248/188.8 |
| 2006/0237929 A1 * | 10/2006 | Taguchi | ............ | B62B 3/00 280/47.34 |
| 2009/0165492 A1 * | 7/2009 | Wilson | ............ | F25C 1/10 62/344 |
| 2015/0292791 A1 * | 10/2015 | Lokhande | ............ | F25D 23/006 62/498 |
| 2017/0051965 A1 * | 2/2017 | Lokhande | ............ | F25D 23/006 |

* cited by examiner

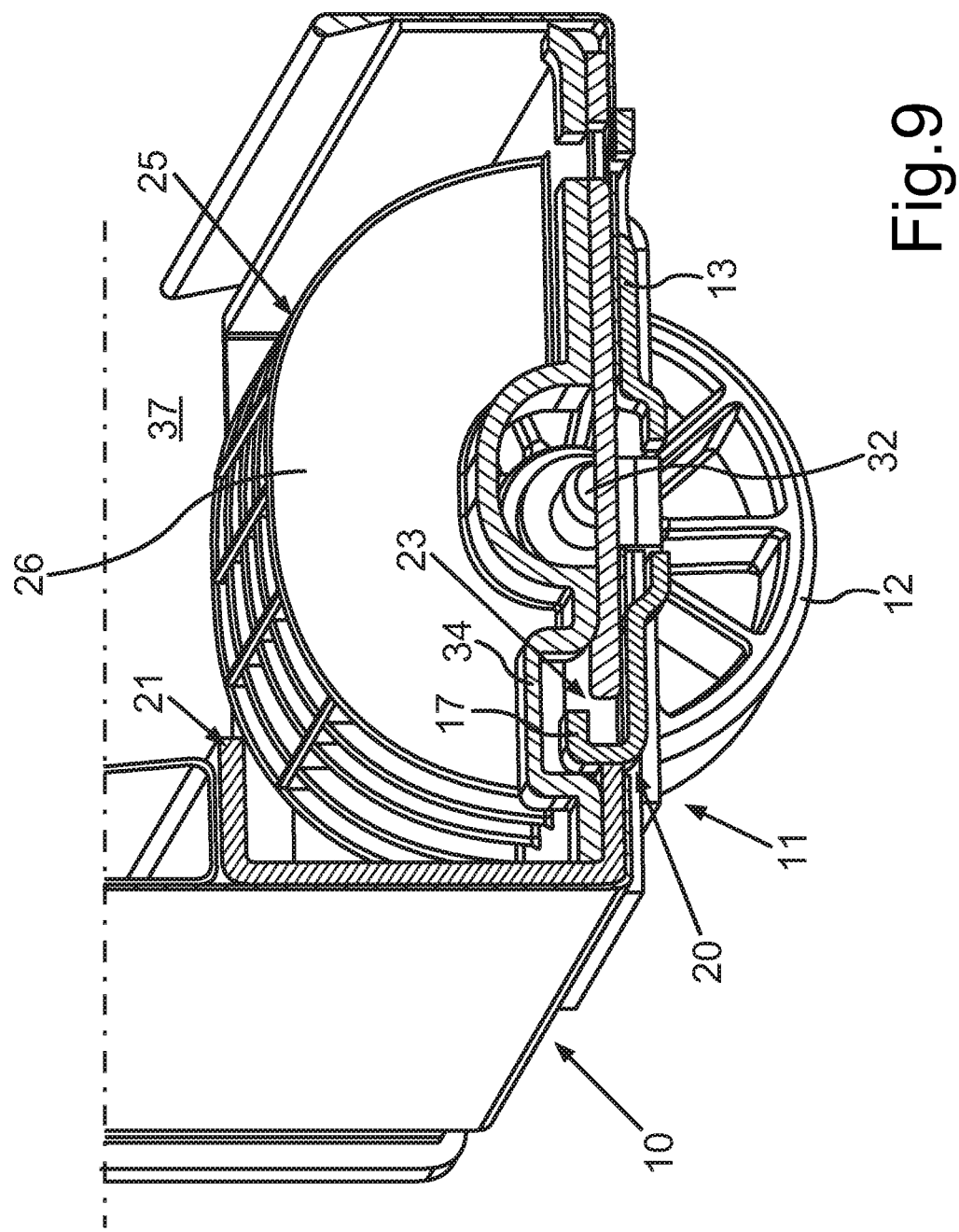

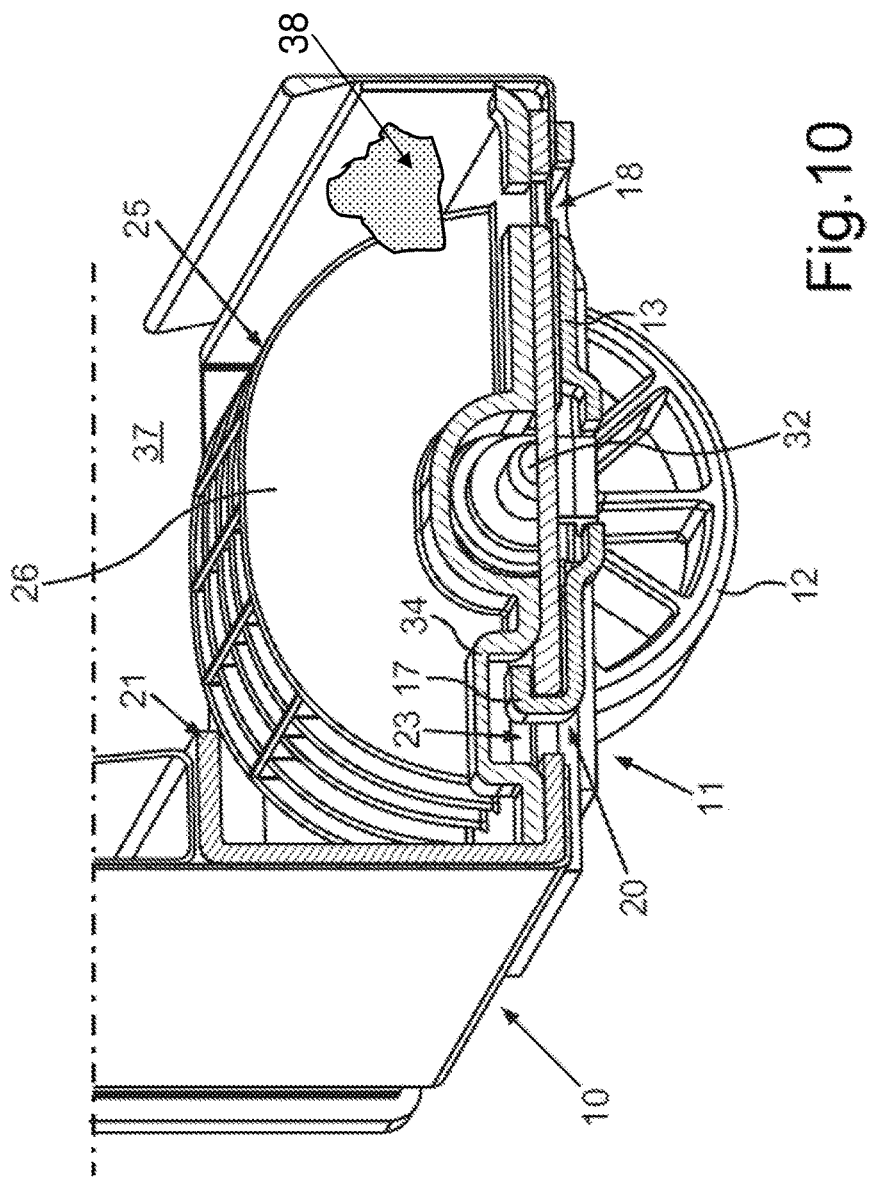

HOUSEHOLD REFRIGERATION APPLIANCE WITH NON-DESTRUCTIVELY RELEASABLE ROLLER ASSEMBLY IN THE BASE OF A HOUSING AND METHOD FOR PRODUCING THE HOUSEHOLD REFRIGERATION APPLIANCE

CROSS-REFERENCE TO RELATED APPLICATION

This application claims the benefit, under 35 U.S.C. § 119, of German patent application DE 10 2016 224 394.2, filed Dec. 7, 2016; the prior application is herewith incorporated by reference in its entirety.

BACKGROUND OF THE INVENTION

Field of the Invention

The invention relates to a household refrigeration appliance having a housing in which at least one receiving area for food is implemented. The household refrigeration appliance has at least one roller which is arranged on the housing and by which the household refrigeration appliance can be rolled on an underlying surface.

Such a design is known from published, non-prosecuted German patent application DE 10 2009 002 500 A1 wherein a transport roller, which is partially recessed into the housing of the household appliance, is arranged only in the rear region of the household appliance. In the case of the known design a roller can be engaged in a bearing seat by a bearing axle, where the bearing seat is part of a housing which is itself in turn integrated and integrally implemented on a side wall of the housing of the household appliance.

SUMMARY OF THE INVENTION

The object of the present invention is to create a household refrigeration appliance which can be rolled by a roller on the base, wherein the reliable positioning of the roller is improved.

A household refrigeration appliance according to the invention contains a housing in which at least one receiving area for food is implemented. A household refrigeration appliance contains at least one roller which is arranged on the housing and by which the household refrigeration appliance can be rolled on an underlying surface. An important concept of the invention can be seen in the fact that the roller is rotatably mounted on a plate-like bearing bracket, where the plate-like bearing bracket is a separate structural element. A roller assembly which contains the roller and the plate-like bearing bracket is arranged non-destructively releasably on a base of the housing. As a result of this design, a subassembly is created which in itself can be prefabricated and is stable in respect of the attachment of the roller, namely the roller assembly. In this context the roller is then already arranged reliably positioned on the separate bearing bracket and can nevertheless be rotated thereon particularly smoothly. The roller is thus permanently attached in stable fashion on a specific structural element, namely the bearing bracket. On the other hand, by means of the bearing bracket the attachment on the base of the housing can then also be achieved simply and nevertheless in stable fashion, which means that also in the case of heavy household refrigeration appliances the forces can be absorbed and transmitted to the roller and as a result of the inherent stability of the bearing bracket the connecting points on the base of the housing can be implemented in mechanically highly load bearing fashion.

As a result of the non-destructively releasable attachment of the roller assembly the latter can then also be installed and uninstalled again simply as a whole without there being a need to undertake any actions in respect of the installation of the roller itself. Fitting of the roller itself which would result in uneven rolling, for example due to a slightly slanting position or a tilting position or a slight rubbing of the roller against another structural element, can thereby be avoided. Because the roller assembly is in particular already prefabricated, it is possible to already reliably check the roll function of the roller on the bearing bracket individually for functional capability and this then serves to ensure that when fitting the roller assembly there is no longer a need to pay attention to the functionality of the roller.

Provision is preferably made that the roller is arranged partially recessed into the housing. When viewed from the base downward the roller thus requires only relatively little installation space and nevertheless fulfills its roller function completely. Such a space-saving inclusion of the roller also enables a certain protected fitting of the roller.

In particular, provision is made that the roller is arranged in such a manner on the housing of the household refrigeration appliance that there is a vertical spacing of between 17 mm and 19 mm, in particular 19 mm, between the base of the housing and a bearing point of a running surface of the roller, which bearing point is at a maximum distance from the base of the housing and is facing away from the housing. Just such a dimension favors the use of such a roller assembly in the case of specific household refrigeration appliances such as for example a household refrigeration appliance having a refrigerating compartment and a further receiving area, in particular a freezer compartment, adjacent thereto in the vertical direction and thus in the height direction of the household refrigeration appliance. Especially in the case of such household refrigeration appliances which are then designed as being correspondingly tall, a correspondingly small spacing from the base is particularly advantageous in order to improve the fitting capability of the household refrigeration appliance. These requirements can also be taken into account by means of this advantageous design.

The plate-like bearing bracket is preferably a one-piece bent sheet-metal part. By this means the bearing bracket can be further improved in terms of its stability and as a result of the one-piece design further additional assembly interfaces are avoided on the bearing bracket. The mechanically high load bearing capacity is thereby achieved to a particular degree.

Provision is preferably made that the base of the housing has lead-throughs, through which hooks which are formed on the bearing bracket pass and through which the roller assembly is suspended on the base. This is a very advantageous design because the installation of the roller assembly can take place very simply. Purposefully, the roller assembly can be suspended on the base and can then afterwards still be moved appropriately into the desired final position. In particular, the bearing bracket has at least two, preferably three, such separate hooks which are spaced apart and each engage into a lead-through in the base. A particularly simple and nevertheless highly functional suspension principle is thereby achieved which also makes it possible to reliably achieve the desired final position of the roller assembly on the base.

Provision is preferably made that the lead-throughs on the base of the housing have a clear spacing such that the roller assembly can be moved relative to the base on the base parallel to a plane in which the base extends. By this means a certain guide for the linear movement of the roller assembly on the base is quasi predetermined in order to achieve the final position of the roller assembly on the base in a defined and exact manner.

Provision is preferably made that the bearing bracket has a through-hole for a screw, where the roller assembly is then screwed on the base in the final position on the base of the housing. The final position achieved in particular by moving the roller assembly relative to the base is then permanently fixed. This too is a very simple concept because as a result of the plurality of hooks which are suspended in through-holes in the base, a certain prepositioning is already achieved and it is thereby possible to fix the position by only a single screw.

Provision is preferably made that the base of the housing has an in particular separate edge strip to which the roller assembly is attached. Considered individually, the edge strip is in turn an inherently stable structural element, which means that receiving a roller assembly is made possible in a simple manner and the corresponding force path from the household refrigeration appliance through the edge strip to the roller assembly is also enabled here without resulting in unwanted adverse effects on the individual components, in particular deformation or the like.

Provision is preferably made that the base of the housing has a backing part, where the edge strip is arranged between the bearing bracket and the backing part. On both sides of the edge strip are thus arranged components which are connected to one another. The further improvement of the mechanically stable attachment is thereby achieved and a torsional stiffness of the entire arrangement of the components is increased.

Provision is preferably made that the edge strip and the backing part each have lead-throughs through which hooks which are formed on the bearing bracket pass and through which the roller assembly is suspended on the edge strip and the backing part. The advantages achievable therewith have already been explained in relation to the aforementioned design having hooks and lead-throughs in the base of the housing. The coupling of the roller assembly to these two separate components, namely the edge strip and the backing part, further improves said stated advantages.

Provision is preferably made that the edge strips and the backing part are fixedly connected, in particular are clinched. By this means, unwanted slippage of the components with respect to one another can be avoided and the strength of the connection of the roller assembly to both parts is thereby improved.

Provision is preferably made that a roller cover is arranged on the base of the housing, by which the roller is completely covered toward the interior of the housing of the household refrigeration appliance. This is a particularly advantageous design because protection for the roller is thereby achieved in the interior of the housing and the running capability of the roller is not impaired. In particular, in the case of a household refrigeration appliance thermally insulating material, in particular insulation foam, is introduced in an interspace between an outer casing of the housing and an inner container, which insulating material is prevented from reaching the roller itself by this roller cover. The roller cover or wheel arch thus forms a boundary toward said thermally insulating material so that on the one hand the thermal insulating effect is maintained without restriction while on the other hand the roller is not adversely affected.

The roller cover is preferably formed in one piece from plastic. It is thereby implemented with a minimum parts configuration and is particularly stiff in itself, which means that the thermally insulating material also has no unwanted mechanical influence on the roller cover.

Provision is preferably made that the household refrigeration appliance comprises a first receiving area which is a refrigerating compartment, where the first receiving area can be closed by two separate doors, each of which is pivotable about a vertical axis. The household refrigeration appliance furthermore contains a second receiving area separate from the first receiving area, which is a freezer compartment, where the second receiving area can be closed by a separate third door. The third door is in particular a front wall of a drawer which can be slid into and out of the second receiving area. Particularly such household refrigeration appliances having a plurality of receiving areas and thus then also having an accompanying plurality of doors which close the receiving areas are associated with a relatively large design of a household refrigeration appliance which then also involves an increased weight. Particularly with regard to such appliances, designs in accordance with the invention as have been stated above are advantageous in order to move the household refrigeration appliance appropriately.

In advantageous fashion provision is made that the household refrigeration appliance contains at least two separate roller assemblies, in particular four separate roller assemblies, and at least one roller is provided in each case. The rollers are arranged in particular in the region of the corners of the base of the housing so that it is possible to easily move the appliance.

Provision can be made that the at least one roller of the roller assembly also contains a brake unit which means that unwanted autonomous rolling of the household refrigeration appliance is prevented. The brake unit can be actuated simply by the user, for example by a simple movement of a lever so that the rolling action is locked or released.

With regard to a design of a household refrigeration appliance having a plurality of rollers provision can be made that all the rollers are in each case part of a roller assembly, as has been explained in above, or at least one or more of the rollers can be otherwise attached, but at least one roller is part of a roller assembly.

The invention furthermore also relates to a method for producing a household refrigeration appliance which is implemented according to the invention or an advantageous design thereof. In the method the roller assembly is installed on the base of the housing, and only after the installation has taken place is an interspace between the base of the housing and an inner container, which delimits the receiving area with its walls, filled at least partially with a thermally insulating material, in particular an insulation foam. Through such a design of a method it is possible to simplify the installation because the roller can already be installed in its final position prior to the addition of the thermally insulating material, where this is made possible in particular by the design of the roller as part of a roller assembly. In particular, a roller cover constitutes a direct delimiting wall of the interspace, such that the insulating material lies directly against the roller cover. With an additional and separately implemented edge strip of the base of the housing the roller assembly can form a pre-assembled unit which is installed on the housing prior to foam-filling. The pre-assembled unit can thus be produced separately which enables simpler and cheaper production.

The indications "top", "bottom", "front", "rear", "horizontal", "vertical", "depth direction", "width direction", "height direction" indicate the positions and orientations existing in the case of normal use and normal arrangement of the appliance and in the case of an observer standing in front of the appliance and looking in the direction of the appliance.

Further features of the invention will emerge from the claims, the figures and the description of the figures. The features and combinations of features stated above in the description as well as the features and combinations of features stated below in the description of the figures and/or shown by themselves in the figures can be used not only in the combination specified in each case but also in other combinations or in isolation without departing from the scope of the invention. Embodiments of the invention which are not explicitly shown and explained in the figures but emerge from and can be produced by separated combinations of features from the described embodiments are thus also to be regarded as included and disclosed. Embodiments and combinations of features which thus do not have all the features of an originally formulated independent claim are also to be regarded as disclosed.

Other features which are considered as characteristic for the invention are set forth in the appended claims.

Although the invention is illustrated and described herein as embodied in a household refrigeration appliance with non-destructively releasable roller assembly in the base of a housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9 is a perspective illustration of the roller assembly in a first installation state in the region of the roller cover; and FIG. 10 is a perspective illustration according to FIG. 9 with an illustration of a further installation state of the roller assembly with respect to the roller cover.

DETAILED DESCRIPTION OF THE INVENTION

Figure 1:
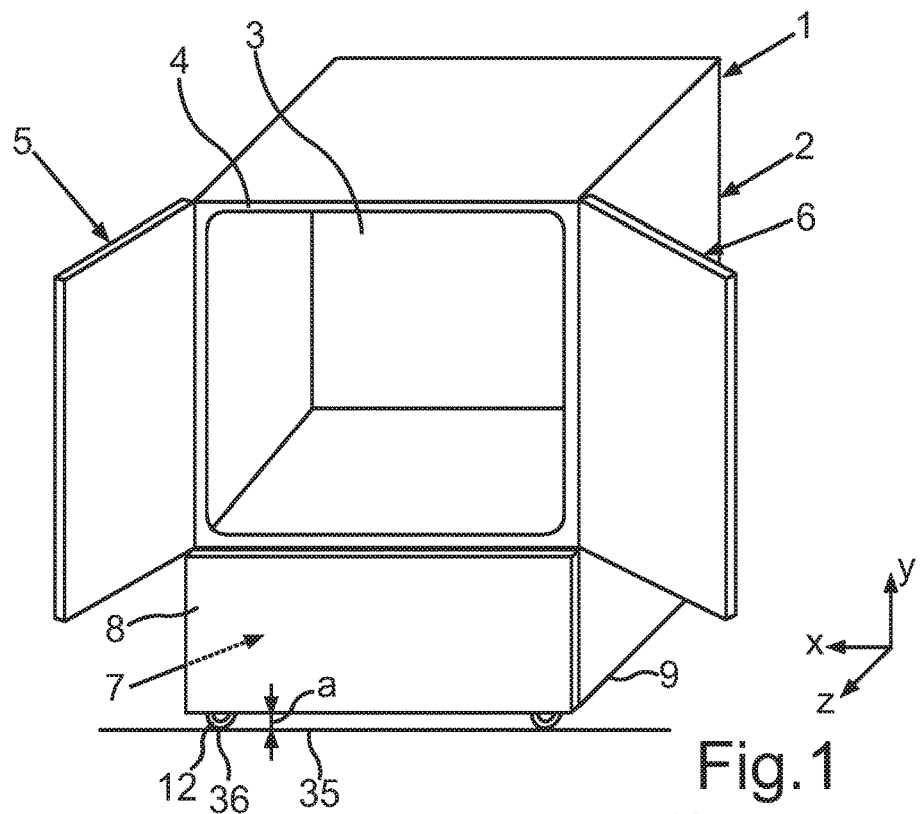
FIG. 1 is a diagrammatic, perspective illustration of an exemplary embodiment of a household refrigeration appliance according to the invention.

The same elements or elements having the same function are identified by the same reference characters in the figures.

Referring now to the figures of the drawings in detail and first, particularly to FIG. 1 thereof, there is shown a simplified illustration of a household refrigeration appliance 1 which is configured for the storage and conservation of food. The household refrigeration appliance 1 contains a housing 2 in which a first receiving area 3 is implemented, which is a refrigerating compartment. The first receiving area 3 is delimited by walls of an internal container 4. On the front side, the inner container 4 and thus also the receiving area 3 have a loading opening which in the exemplary embodiment can be closed by means of two separate doors 5 and 6. The loading opening is designed to be uninterrupted and continuous, such that said loading opening can only be closed completely by the two doors 5 and 6. The two doors 5 and 6 are arranged pivotably on opposite sides of the housing 2 and can be pivoted by way of vertical axes which are oriented in the height direction (y-direction).

The household refrigeration appliance 1 furthermore contains a second receiving area 7 separate to the first receiving area 3, which here in the height direction of the household refrigeration appliance 1 is arranged beneath the first receiving area 3 and is also arranged completely outside the first receiving area 3. The second receiving area 7 is a freezer compartment. The second receiving area 7 is also delimited by walls of an internal container, where a loading opening on the front side can here also be closed by a third door 8. In the exemplary embodiment the third door 8 is a front wall of a drawer which can be slid in the depth direction (z-direction) into and out of the second receiving area 7. The third door 8 is a door separate to the two doors 5 and 6. The three doors 5, 6, 8 are arranged in non-overlapping fashion and are in particular visible parts on the front.

Figure 2:
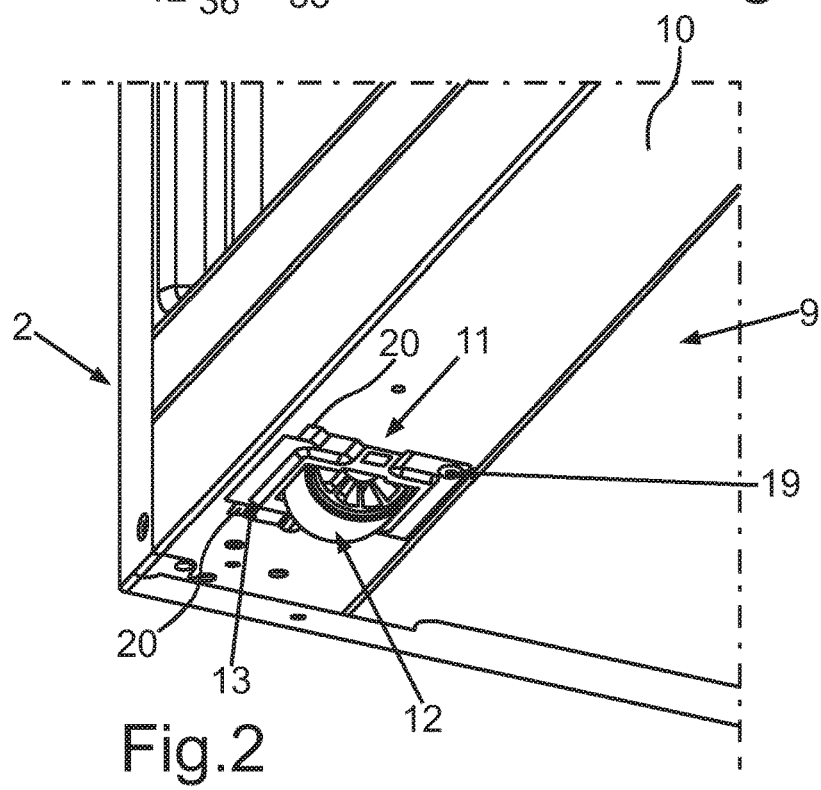
FIG. 2 is a perspective illustration of a subarea of the household refrigeration appliance according to FIG. 1 viewed toward a base of a housing of the household refrigeration appliance.

The housing 2 contains a base 9, which is viewed in this partial illustration in FIG. 2. The base 9 has an edge strip 10 which is arranged on the front side and is a one-piece L-shaped strip part. Arranged on the base 9, in particular on the edge strip 10, is a roller assembly 11 which in particular is attached non-destructively releasably. The roller assembly 11 contains a roller 12 which is arranged rotatably on a bearing bracket 13 separate therefrom. The bearing bracket 13 is a plate-like part. The bearing bracket 13 is a one-piece bent sheet-metal part. The roller 12 is rotatably attached on the bearing bracket 13. In particular, a non-destructively non-releasable connection between the bearing bracket 13 and the roller 12 is implemented here.

Figure 3:
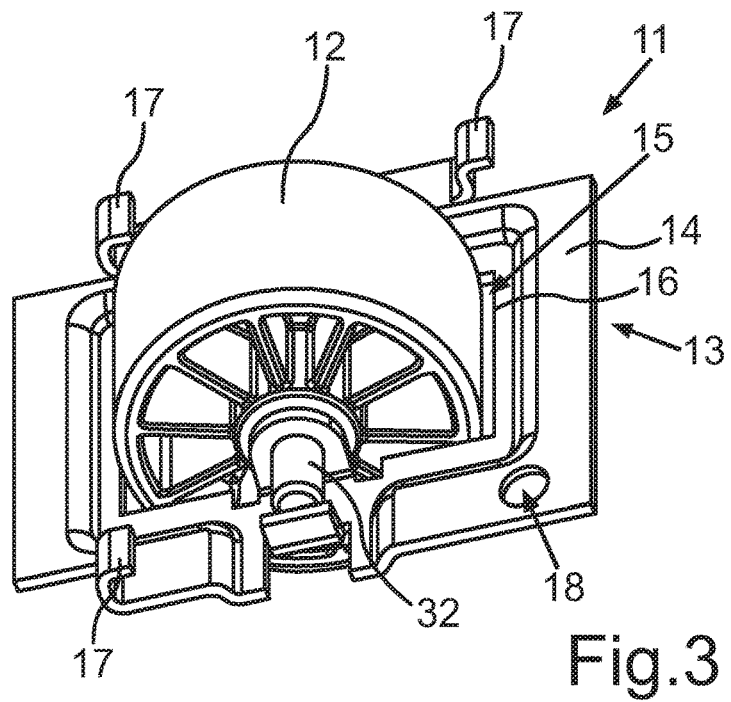
FIG. 3 is an enlarged perspective illustration of an exemplary embodiment of a roller assembly of the household refrigeration appliance according to FIG. 1 and FIG. 2.

FIG. 3 shows an enlarged illustration of the roller assembly 11. Shown here is a view of that side which in the installed state, as is shown in FIG. 2, is facing the edge strip 10. In the installed state an upper side 14 of the bearing bracket 13 is bearing against the edge strip 10 and is thus facing the edge strip 10.

The bearing bracket 13 has a receiving facility 15 in which the roller 12 is received. The receiving facility 15 also has a lead-through 16 which constitutes a hole such that in the installed state on the bearing bracket 13 the roller 12 extends on both sides of said plate-like bearing bracket 13.

The bearing bracket 13 furthermore contains a plurality of hooks 17 which are tabs or bars that are bent upward, angled, and in particular L-shaped. The hooks 17 are inserted into lead-throughs which are formed on the base 9, such that the roller assembly 11 can be simply installed and suspended on the base 9, in particular on the edge strip 10. The bearing bracket 13 furthermore also has a hole 18 which is a screw hole. This preferably only one screw hole serves to enable the roller assembly 11 to be screwed to the base 9, in particular to the edge strip 10, as is shown in FIG. 2. There a screw 19 has already been introduced through the hole 18 and a screw connection of the roller assembly 11 on the base 9 has been implemented, thereby fixing the position thereof.

FIG. 2 shows that the hooks 17 are pushed through lead-throughs 20 in the edge strip and are correspondingly suspended there.

As can be seen, a cutout is likewise implemented in the edge strip 10, such that the roller 12 is only partially inserted into the housing 2 and is thus to a certain extent recessed in the housing 2.

Figure 4:
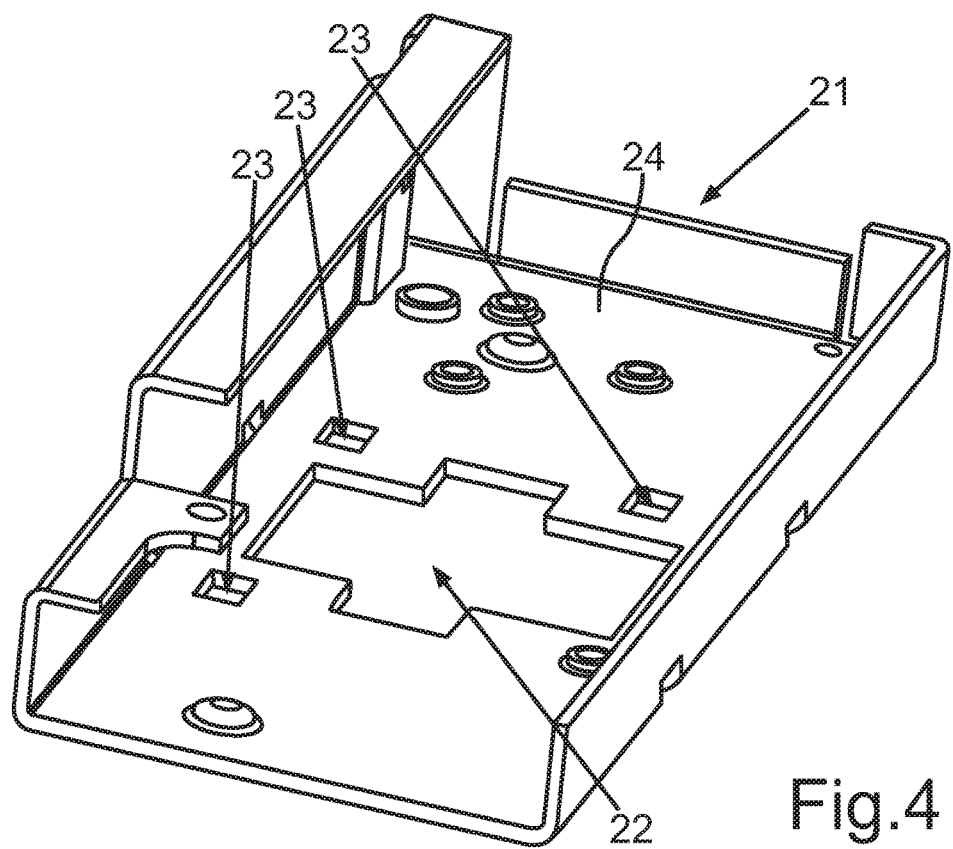
FIG. 4 is a perspective illustration of a backing part.

In particular, provision is made that the arrangement has a separate backing part 21, as is shown in a perspective illustration in FIG. 4. The backing part 21 is preferably implemented integrally and constitutes a profile which can be incorporated into the edge strip 10. The backing part 21 is preferably made from metal. It has in particular a cutout 22, through which the roller 12 can extend. Furthermore the backing part 21 contains additional lead-throughs 23, through which the hooks 17 of the bearing bracket 13 extend. The lead-throughs 23 are preferably arranged in alignment with the lead-throughs 20 in the edge strip 10, such that the hooks 17 extend both through the lead-throughs 20 and also through the lead-throughs 23. They are then bearing on an upper side 24 of the backing part 21 which is facing away from the edge strip 10, and are then correspondingly suspended there.

Figure 5:
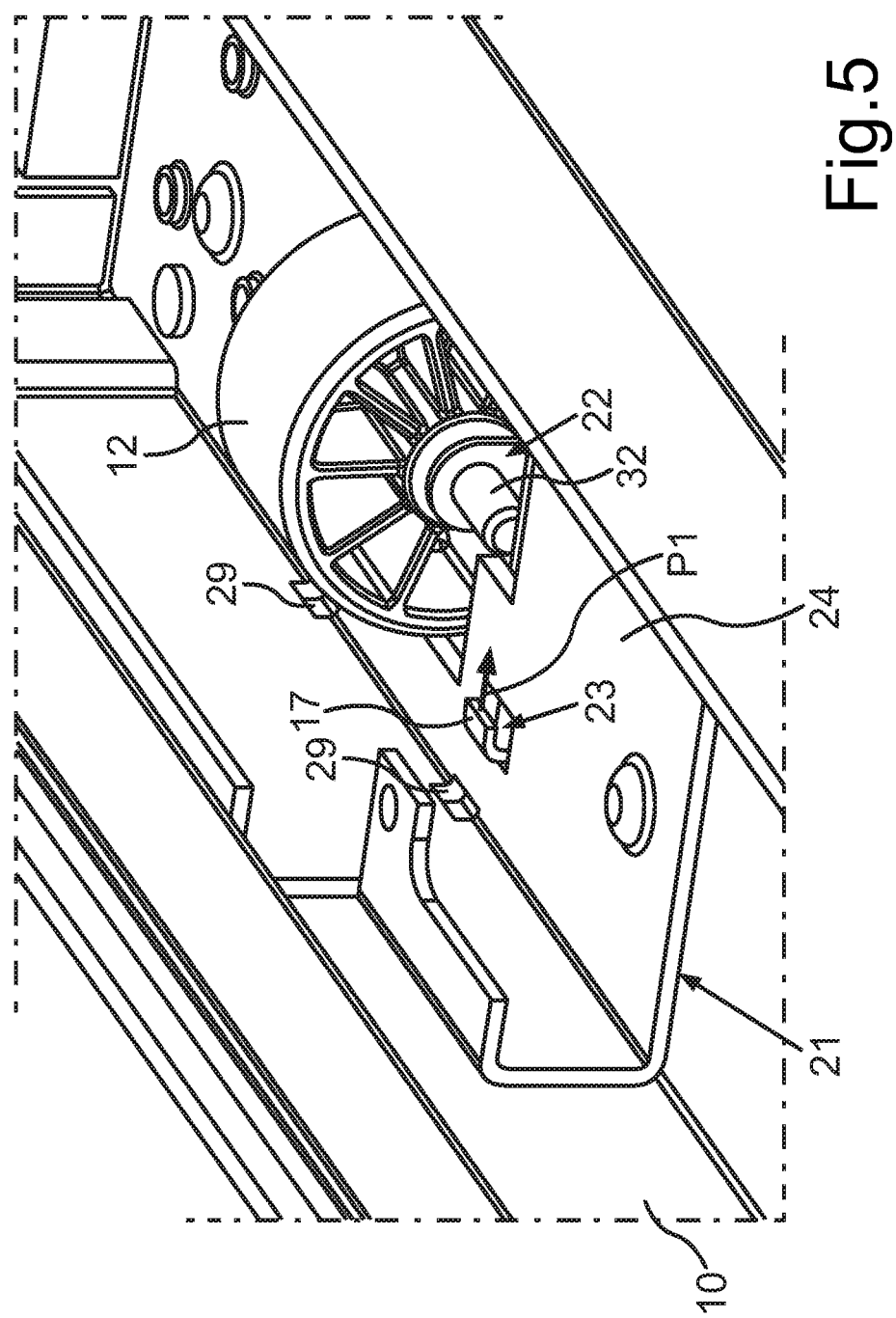
FIG. 5 is a perspective partial illustration of a specific installation state of a roller assembly on the base of the housing.

FIG. 5 shows a perspective illustration of the installed state of the backing part 21 on the edge strip 10. FIG. 5 shows a view from the interior of the housing 2 toward the aforementioned components. It can be seen that the roller assembly 11 is arranged in an intermediate installation position in which the hooks 17 have been taken through the lead-throughs 20 and 23 but have not yet arrived in the final position to which the hooks 17 are then still to be moved. As indicated by the arrow P1 in FIG. 5, starting from the intermediate installation position shown in FIG. 5 a movement of the roller assembly 11 in the direction according to the arrow P1 is then to be performed.

Figure 6:
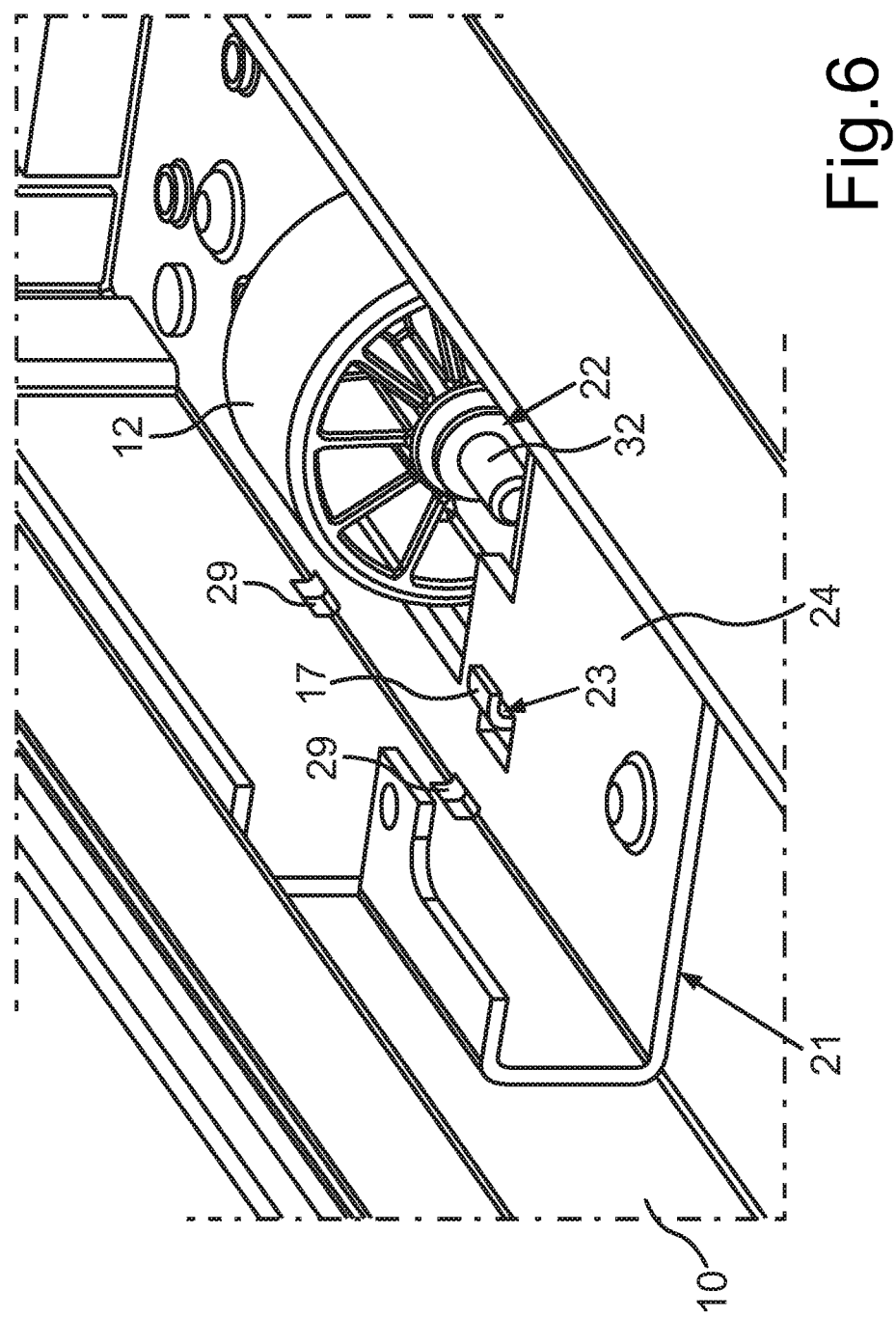
FIG. 6 is a perspective illustration according to FIG. 5, where an installation state different from FIG. 5 is shown in FIG. 6.

FIG. 6 then shows the illustration according to FIG. 5, where in FIG. 6 the roller assembly 11 has been moved in the direction of the arrow P1 and the roller assembly 11 has reached its final position on the base 9. The hooks 17 are then bearing on the upper side 24 and are prevented from slipping out downward and thus in the height direction.

In the illustrations according to FIG. 5 and FIG. 6, in particular no roller cover is yet shown to be present in order to allow the respective positions of the roller 12 to be better seen.

Figure 7:
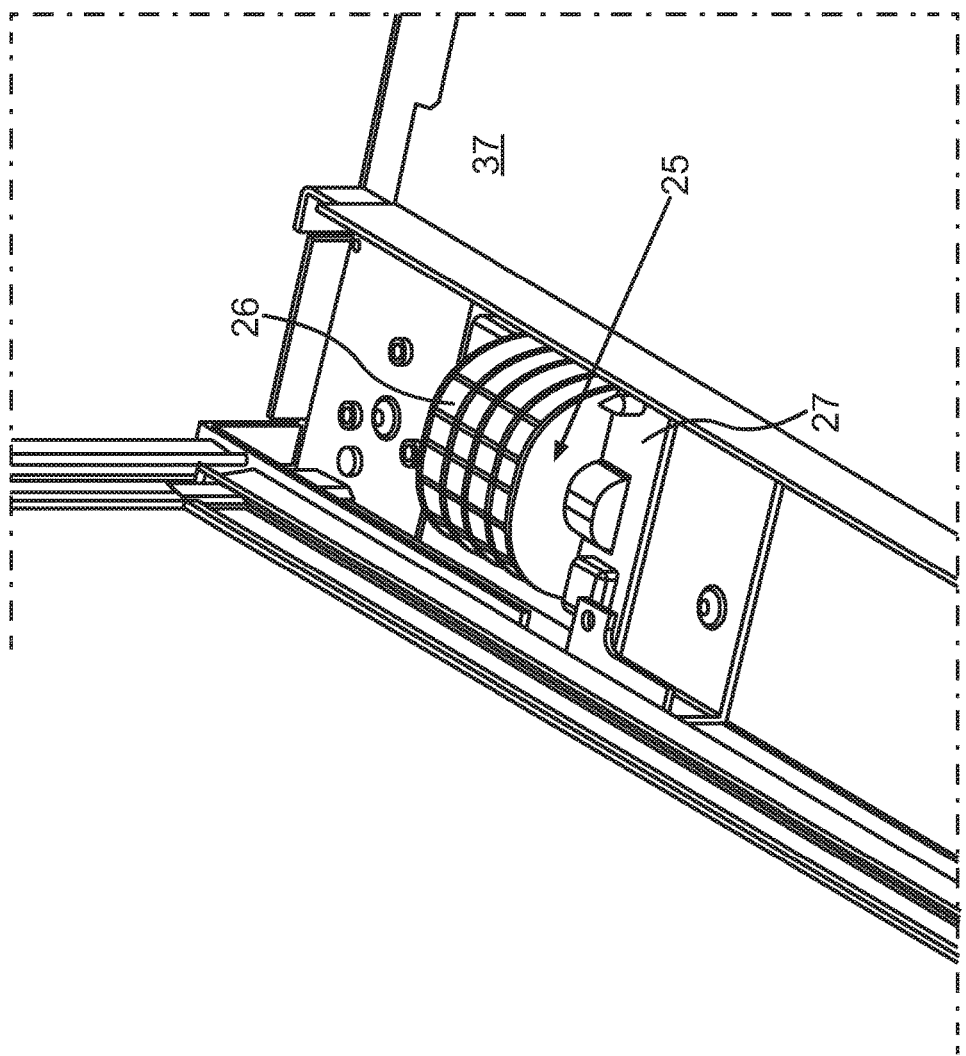
FIG. 7 is a perspective illustration of a subarea of the household refrigeration appliance, wherein here a roller cover is additionally installed.

In FIG. 7 on the other hand, the design is shown having a roller cover 25 of a type which is implemented in similar fashion to a wheel arch and covers the roller 12 from above in hood-like fashion. The roller cover 25 is formed in one piece, in particular from plastic. In addition to the hood-like region 26 it preferably contains a base plate 27 which in the installed state, as is shown in FIG. 7, is seated on the upper side 24 and is attached there. A non-destructively releasable connection can be provided here, for example a snap fastening. To this end, as is shown in a perspective illustration in FIG. 8, tabs 28 which engage in receiving facilities 29 (FIG. 5 and FIG. 6) can be formed on the base plate 27. Correspondingly, further tabs 30 which in particular are sprung are implemented on the opposite side; said further tabs 30 then engage with opposing receiving facilities on the backing part 21, in particular snap or lock in place there.

Figure 8:
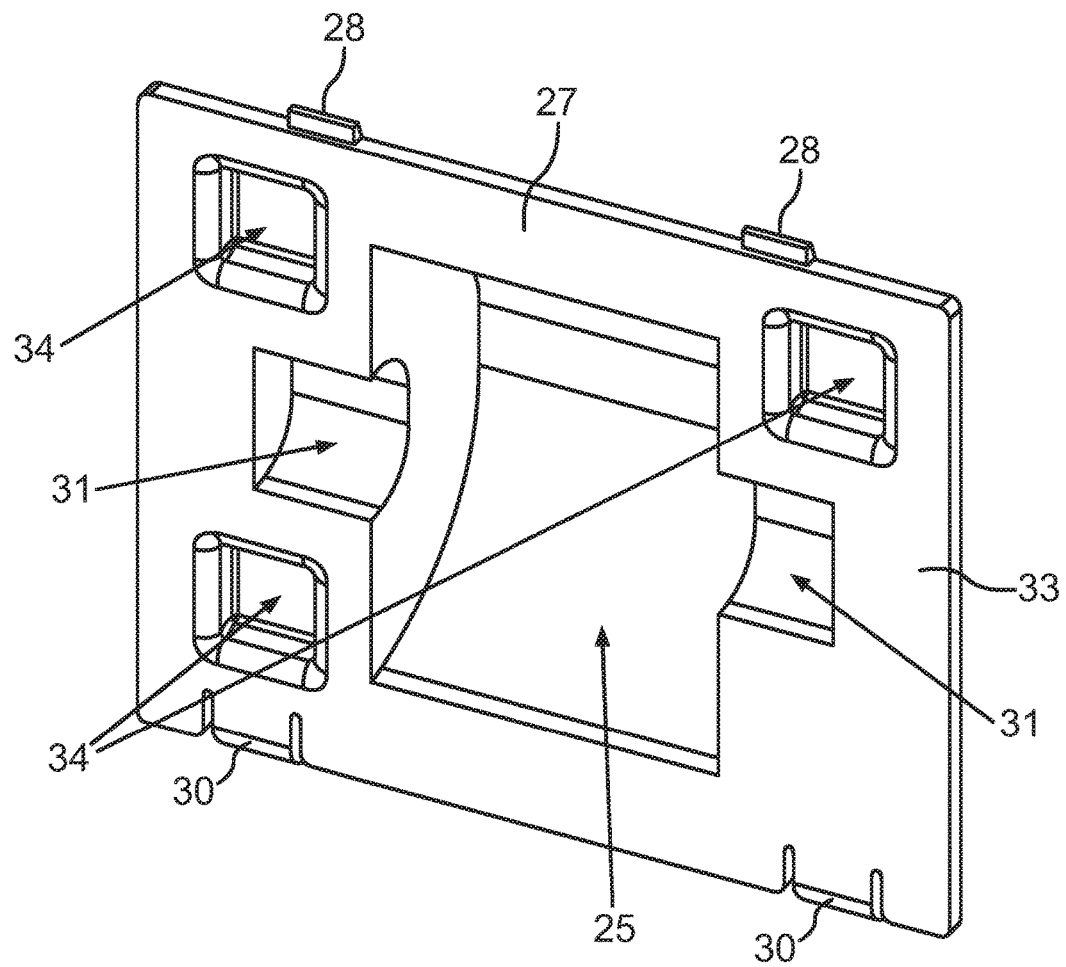
FIG. 8 is a perspective illustration of an exemplary embodiment of such a roller cover.

As can be seen in FIG. 8, the one-piece roller cover also contains receiving facilities 31 for a roller axle 32 (FIG. 3, FIG. 5 and FIG. 6). FIG. 8 shows a view of the roller cover 25 in which an underside 33 is illustrated. The roller cover 25 is seated with said underside 33 on the upper side 24. Furthermore, hump-shaped raised parts 34 are also implemented, into which the hooks 17 are inserted. As can be seen in FIG. 7, the roller cover 25 is implemented in completely uninterrupted fashion in the upward direction, such that the interior of the housing 2 is separated from the roller 12. The interior is an interspace 37 which is formed between the inner container 4 and an outer casing of the housing 2, and in which thermally insulating material 38, seen in FIG. 10, is introduced, in particular after the installation of the roller assembly 11 and the roller cover 25.

FIG. 9 shows a subarea in which the roller cover 25 is illustrated and the roller assembly 11 is implemented in an intermediate installation state, as has already been explained in relation to FIG. 5. It can be seen here that the roller assembly 11 and in particular the roller 12 are positioned asymmetrically with respect to the shape of the hood-like region 26.

In FIG. 10 on the other hand the installed final state is then shown, as has also already been explained in relation to FIG. 6.

On the basis of FIG. 10 it then only remains necessary to screw the screw 19 in through the hole 18, such that the final position achieved is fixed.

In FIG. 2 it can be seen that the described roller assembly 11 is arranged in a front left corner region of the base 9. A corresponding further roller assembly 11 is in particular also arranged at the front right corner region. In particular, a further roller 12, in particular a roller assembly 11, is also arranged in each case at the rear left and right corner regions of the four-cornered base 9. The explanations as set forth in relation to the roller assembly 11 then also apply in particular to said at least one further roller assembly, preferably to all other further roller assemblies.

In the installed state the roller 12 extends only partially into the housing 2. There is a vertical spacing a (FIG. 1) of in particular between 17 mm and 20 mm, in particular 19 mm, between the base 9 and a bearing point 36 of a running surface of the roller 12, which bearing point 36 is at a maximum distance from the base 9 and is facing away from the housing 2. The bearing point 36 is sitting on an underlying surface 35 on which the household refrigeration appliance 1 is positioned and on which it can be rolled.

The following is a summary list of reference numerals and the corresponding structure used in the above description of the invention:

1 Household refrigeration appliance
2 Housing
3 First receiving area
4 Inner container
5 Door
6 Door
7 Second receiving area
8 Door 9 Base
10 Edge strip
11 Roller assembly
12 Roller
13 Bearing bracket
14 Upper side
15 Receiving facility
16 Lead-through
17 Hook
18 Hole
19 Screw
20 Lead-through
21 Backing part
22 Cutout
23 Lead-through
24 Upper side
25 Roller cover
26 Region
27 Base plate
28 Tab
29 Receiving facility
30 Tab
31 Receiving facility
32 Roller axle
33 Underside
34 Raised part
35 Underlying surface
36 Bearing point
37 Interspace
a Spacing
P1 Arrow

The invention claimed is:

1. A household refrigeration appliance, comprising:
a housing defining at least one receiving area for food and having a base, said base having an edge strip and a backing part; and
a roller assembly being attached to said base, said roller assembly having a plate-shaped, separate bearing bracket and at least one roller disposed on said housing, said roller for rolling the household refrigeration appliance on an underlying surface, said roller being disposed rotatably mounted on said plate-shaped, separate bearing bracket and said roller assembly containing said roller and said plate-shaped, separate bearing bracket disposed non-destructively releasably on said base of said housing, said edge strip being disposed between said plate-shaped, separate bearing bracket and said backing part.

2. The household refrigeration appliance according to claim 1, wherein said roller is disposed partially recessed into said housing.

3. The household refrigeration appliance according to claim 1, wherein said roller is disposed in such a manner on said housing that there is a vertical spacing of between 17 mm and 19 mm between said base of said housing and a bearing point of a running surface of said roller, said bearing point is at a maximum distance from said base of said housing and is facing away from said housing.

4. The household refrigeration appliance according to claim 1, wherein said plate-shaped, separate bearing bracket is a one-piece bent sheet-metal part.

5. The household refrigeration appliance according to claim 1, wherein:
said plate-shaped, separate bearing bracket has hooks; and
said base has lead-throughs formed therein through which said hooks of said plate-shaped, separate bearing bracket pass and through which said roller assembly is suspended on said base.

6. The household refrigeration appliance according to claim 5, wherein said lead-throughs on said base have a clear spacing such that said roller assembly can be moved relative to said base on said base.

7. The household refrigeration appliance according to claim 1, wherein said plate-shaped, separate bearing bracket has a through-hole formed therein for a screw, and said roller assembly is then screwed into a final position on said base of said housing.

8. The household refrigeration appliance according to claim 1, wherein:
said plate-shaped, separate bearing bracket has hooks; and
said edge strip and said backing part each have lead-throughs formed therein through which said hooks of said plate-shaped, separate bearing bracket pass and through which said roller assembly is suspended on said edge strip and said backing part.

9. The household refrigeration appliance according to claim 1, wherein said edge strip and said backing part are fixedly connected.

10. The household refrigeration appliance according to claim 1, further comprising a roller cover disposed on said base of said housing, by means of said roller cover said roller is completely covered toward an interior of said housing.

11. The household refrigeration appliance according to claim 10, wherein said roller cover is formed in one piece from plastic.

12. The household refrigeration appliance according to claim 1,
further comprising doors including a first door, a second door, and a third door; and
wherein said at least one receiving area includes a first receiving area which is a refrigerating compartment, said first receiving area can be closed by said first and second doors, each of said first and second doors being pivotable about a vertical axis, said at least one receiving area including a second receiving area being separate from said first receiving area and is a freezer compartment, said second receiving area can be closed by means of said third door being separate from said first and second doors.

13. The household refrigeration appliance according to claim 12, further comprising a drawer having a front wall and can be slid into and out of said second receiving area, said front wall forming said third door.

14. The household refrigeration appliance according to claim 1, wherein said edge strip and said backing part are clinched.

15. A method for producing a household refrigeration appliance, which comprises the steps of:
installing a roller assembly non-destructively releasably on a base of a housing, the roller assembly having a plate-shaped, separate bearing bracket and at least one roller disposed on the housing, the roller being rotatably mounted by the bearing bracket for rolling the household refrigeration appliance on an underlying surface, the plate-shaped, separate bearing bracket having hooks, the housing defining at least one receiving area for food, the housing having an inner container and an outer casing defining an interspace therebetween;
forming lead-throughs in the base and passing the hooks through the lead-throughs and suspending the roller assembly on the base;

providing a roller cover disposed on the base of the housing, the roller cover completely covering the roller toward an interior of the housing; and subsequently filling an interspace between the base of the housing and an inner container, which delimits the receiving area with walls of the inner container, at least partially with a thermally insulating material being an insulating foam, defining a boundary with the roller cover toward the insulation foam for preventing the insulation foam from reaching the roller.

16. A household refrigeration appliance, comprising:

a housing defining at least one receiving area for food and having a base, said housing having an inner container and an outer casing defining an interspace therebetween; and a roller assembly having a plate-shaped, separate bearing bracket and at least one roller disposed on said housing, said roller for rolling the household refrigeration appliance on an underlying surface, said roller being disposed rotatably mounted on said plate-shaped, separate bearing bracket and said roller assembly disposed non-destructively releasably on said base of said housing, said plate-shaped, separate bearing bracket having hooks;

said base having lead-throughs formed therein said hooks passing through said lead-throughs and suspending said roller assembly on said base;

a roller cover being disposed on said base of said housing, said roller cover completely covering said roller toward an interior of said housing;

thermally insulating insulation foam provided in said interspace, said roller cover defining a boundary toward said insulation foam preventing said insulation foam from reaching the roller.

\* \* \* \* \*